(12) United States Patent
O'Rear et al.

(10) Patent No.: US 6,890,962 B1
(45) Date of Patent: May 10, 2005

(54) GAS-TO-LIQUID $CO_2$ REDUCTION BY USE OF $H_2$ AS A FUEL

(75) Inventors: Dennis J. O'Rear, Petaluma, CA (US); Nicholas Brancaccio, Walnut Creek, CA (US)

(73) Assignee: Chevron U.S.A. Inc., San Ramon, CA (US)

( * ) Notice: Subject to any disclaimer, the term of this patent is extended or adjusted under 35 U.S.C. 154(b) by 0 days.

(21) Appl. No.: 10/720,674

(22) Filed: Nov. 25, 2003

(51) Int. Cl.[7] .......................... C07C 27/00; C10G 35/00
(52) U.S. Cl. .................... 518/700; 702/703; 208/133; 208/141
(58) Field of Search ................. 518/700, 702, 518/703; 208/133, 141

(56) References Cited

U.S. PATENT DOCUMENTS

| | | | |
|---|---|---|---|
| 4,542,122 A | 9/1985 | Payne et al. | |
| 4,568,663 A | 2/1986 | Mauldin | |
| 4,621,072 A | 11/1986 | Arntz et al. | |
| 4,663,305 A | 5/1987 | Mauldin et al. | |
| 5,423,894 A | 6/1995 | Child et al. | |
| 5,545,674 A | 8/1996 | Behrmann et al. | |
| 5,689,031 A | 11/1997 | Berlowitz et al. | |
| 6,043,288 A | 3/2000 | DeGeorge et al. | |
| 6,103,773 A | 8/2000 | Wittenbrink | |
| 6,147,126 A | 11/2000 | DeGeorge et al. | |
| 6,693,138 B2 * | 2/2004 | O'Rear | 518/700 |
| 6,703,429 B2 | 3/2004 | O'Rear | |

FOREIGN PATENT DOCUMENTS

| | | |
|---|---|---|
| EP | 0 635 555 A2 | 1/1995 |
| EP | 0 921 184 A1 | 6/1999 |
| WO | 00/69989 A1 | 11/2000 |
| WO | 00/69990 A1 | 11/2000 |

OTHER PUBLICATIONS

U.S. patent application No. 10/720,673, O'Rear et al., *Control of CO2 Emissions from a Fischer–Tropsch Facility by Use of Dual Functional syngas Conversion*, filed on Nov. 25, 2003.
U.S. patent application No. 10/720,675, O'Rear, et al., *Control of CO2 Emissions from a Fischer–Tropsch Facility by Use of Multiple Reactors*, filed on Nov. 25, 2003.
U.S. patent application No. 10/118,029, O'Rear, *Reducing $CO_2$ Levels in $CO_2$ –Rich Natural Gases Converted into Liquid Fuels*, filed Apr. 9, 2002.
"Alchemy in Alaska", *Frontiers* pp 14–20 (2002).

* cited by examiner

*Primary Examiner*—J. Parsa
(74) *Attorney, Agent, or Firm*—Burns, Doane, Swecker & Mathis, L.L.P.

(57) ABSTRACT

$CO_2$ emissions Gas-to-Liquids (GTL) facilities such as, for example, Fischer-Tropsch facilities, are minimized by using recovered hydrogen as a fuel in at least one furnace in the GTL facility. A process for manufacturing hydrocarbonaceous products from a methane-containing feedstock in a GTL facility comprising at least one furnace generating reduced $CO_2$ emissions comprises forming syngas from a methane-containing feedstock by means of a partial oxidation reaction. A hydrogen rich fuel is used in at least one furnace in the GTL facility to reduce $CO_2$ emissions generated by the facility.

20 Claims, 2 Drawing Sheets

GAS-TO-LIQUID CO₂ REDUCTION BY USE OF H₂ AS A FUEL

BACKGROUND OF THE INVENTION

1. Field of the Invention

The present invention is directed to minimizing $CO_2$ emissions from Gas-to-Liquids (GTL) facilities. In particular, the present invention is directed to reducing $CO_2$ emissions from GTL facilities such as, for example, Fischer-Tropsch facilities, by using hydrogen as a fuel used in the GTL facilities.

2. Description of the Related Art

The conversion of natural gas assets into more valuable chemicals, including combustible liquid fuels, is desired to more effectively utilize these natural gas assets. The conversion of natural gas to more valuable chemical products generally involves syngas generation. Syngas generation involves converting natural gas, which is mostly methane, to synthesis gas or syngas, which is a mixture of carbon monoxide and hydrogen. Syngas can be used as a feedstock for producing a wide range of chemicals, including combustible liquid fuels, methanol, acetic acid, dimethyl ether, oxo alcohols, and isocyanates.

There are two main approaches to convert remote natural gas assets into conventional transportation fuels and lubricants using syngas. Natural gas may be converted into syngas followed by a Fischer-Tropsch process, or natural gas may be converted into syngas followed by methanol synthesis, which is followed by a methanol to gas process (MTG) to convert methanol into highly aromatic gasoline. The syngas generation is the most costly step of these processes. A critical feature of these processes is producing syngas with a desired $H_2/CO$ ratio to optimize formation of the desired products and to avoid problems in the syngas formation step.

Syngas can be generated from three major chemical reactions. The first involves steam reforming of methane. The ratio of hydrogen to carbon monoxide, which is formed from this process, is typically approximately 3.0. A second process for syngas generation involves dry reforming of methane or the reaction between carbon dioxide and methane. An attractive feature of this method is that carbon dioxide is converted into syngas; however, this method has problems with rapid carbon deposition. The carbon deposition or coke forming reaction is a separate reaction from the one that generates the syngas and occurs subsequent to the syngas formation reactor. However, the reaction of methane in dry reforming is slow enough that long residence times are required for high conversion rates and these long residence times lead to coke formation. The ratio of hydrogen to carbon monoxide, which is formed from this process, is typically approximately 1.0. A third process for syngas generation involves partial oxidation of methane using oxygen. The ratio of hydrogen to carbon monoxide, which is formed from this process, is typically approximately 2.0. However, in commercial practice, some amount of steam is typically added to a partial oxidation reformer in order to control carbon formation and the addition of steam tends to increase the $H_2/CO$ ratio above 2.0.

It is possible to produce syngas with a $H_2/CO$ ratio that is above the ratio ideally desired for the process in which the syngas is to be used, and then to remove excess hydrogen to adjust the ratio to the desired value. However, the $H_2$ removal process employs expensive $H_2$ separation systems that tend to foul and decline in performance with use.

The Fischer-Tropsch and MTG processes both have advantages and disadvantages. For instance, the Fischer-Tropsch process has the advantage of forming products that are highly paraffinic. Highly paraffinic products are desirable because they exhibit excellent combustion and lubricating properties. Unfortunately, a disadvantage of the Fischer-Tropsch process is that the Fischer-Tropsch process emits relatively large amounts of $CO_2$ during the conversion of natural gas assets into saleable products. An advantage of the MTG process is that the MTG process produces highly aromatic gasoline and LPG fractions (e.g., propane and butane). However, while highly aromatic gasoline produced by the MTG process is generally suitable for use in conventional gasoline engines, highly aromatic MTG gasoline may be prone to form durene and other polymethyl aromatics having low crystallization temperatures that form solids upon standing. In addition, the MTG process is more expensive than the Fischer-Tropsch process and the products produced by the MTG process cannot be used for lubricants, diesel engine fuels or jet turbine fuels. Furthermore, like the Fischer-Tropsch process, the MTG process also generates $CO_2$.

Hydrogen recovered during petrochemical processing has been used for various purposes. For example, U.S. Pat. Nos. 6,043,288 and 6,103,773, and 6,147,126 to Exxon describe recovering hydrogen from syngas for uses including hydrotreating and catalyst regeneration, while CO rich off-gas is used for fuel.

In another example, BP has disclosed using a steam reformer followed by a membrane separator to recover excess hydrogen which is used as a fuel gas in the steam reformer. ("Alchemy in Alaska," Frontiers, December 2002, pages 14–20).

In addition, WO 00/69990 and WO 00/69989 describe producing hydrogen from light products produced from hydrocracking for use in various operations, including hydrocracking. The feedstock used in the disclosed processes can be a Fischer-Tropsch feedstock. However, the methods of hydrogen production described in WO '990 beginning at page 9, line 30 and in WO '989 at page 12, lines 11–17 include partial oxidation, steam-methane reformation and catalytic dehydrogenation.

Finally, EP 635555A describes using naphtha reformation to produce hydrogen used for upstream hydrotreating. EP '555 refers to the refining of petroleum products.

There remains a need for efficient processes to convert a methane-containing feedstock into hydrocarbonaceous products in a GTL facility and to minimize $CO_2$ emissions generated by such GTL processes.

SUMMARY OF THE INVENTION

The present invention satisfies the above objectives by providing a process that minimizes the $CO_2$ generated by a GTL facility by using hydrogen produced during upgrading processes as a fuel in the GTL facility.

The process, according to the present invention, for manufacturing hydrocarbonaceous products from a methane-containing feedstock in a GTL facility comprising at least one furnace generating reduced $CO_2$ emissions includes forming syngas from a methane-containing feedstock by means of a partial oxidation reaction using a gaseous oxidant comprising molecular oxygen and converting the syngas into $C_{3+}$ liquid products and recovering an unreacted gas. The process further includes separating the $C_{3+}$ liquid products to obtain a naphtha. The process also includes reforming the naphtha to produce a by-product hydrogen-containing gas stream and recovering a hydrogen rich gas stream from at least one of the syngas and the by-product hydrogen-containing gas stream or combinations thereof. Finally, the process includes using a hydrogen rich fuel comprising the hydrogen rich gas stream and the unreacted gas in at least one furnace in the GTL facility to reduce $CO_2$ emissions generated by the facility.

According to another aspect of the present invention, the process for manufacturing hydrocarbonaceous products from a methane-containing feedstock in a GTL facility comprising at least one furnace generating reduced $CO_2$ emissions includes forming syngas from a methane-containing feedstock by means of a partial oxidation reaction using a gaseous oxidant comprising molecular oxygen and converting the syngas into $C_{3+}$ liquid products and recovering an unreacted gas. The process also includes separating the $C_{3+}$ liquid products to obtain a naphtha. The process also includes reforming the naphtha to produce a by-product hydrogen-containing gas stream and recovering a hydrogen rich gas stream from at least one of the syngas and the by-product hydrogen-containing gas stream or combinations thereof. Finally, the process includes using a hydrogen rich fuel comprising the hydrogen rich gas stream and the unreacted gas in at least one furnace in the GTL facility so that a mole percent of $CO_2$ in a flue gas generated from the furnace, on a water-free basis, is represented by the following formula: $P-CO_2 \leq 22/(1-4.76(E-CO_2/100))$, wherein $E-CO_2$ represents mole percent excess oxygen, on a water-free basis.

Tail gas, having a high $CO_2$ content and low BTU content, is the normal fuel used in GTL facilities, resulting in high $CO_2$ emissions. Thus, the present invention minimizes $CO_2$ emissions from GTL processes by recovering hydrogen and using the recovered hydrogen in fuel gas in the GTL facility. By increasing the hydrogen content of the fuel gas, the present invention can reduce the $CO_2$ content of a flue gas generated by a GTL facility. Accordingly, one important advantage of the present invention is that it can reduce or substantially minimize $CO_2$ emissions generated by Fischer-Tropsch GTL processes or furnaces without having to employ expensive $CO_2$ isolation techniques including, but not limited to, gaseous $CO_2$ compression, liquefaction or solidification.

DETAILED DESCRIPTION OF THE PREFERRED EMBODIMENTS

In the present invention, hydrogen is recovered from the GTL facility and used as a fuel in at least one furnace in a GTL facility. The hydrogen used can be recovered from any number of sources in a GTL process including, but not limited to, syngas streams, unreacted gas streams from a syngas conversion unit, gas streams associated with hydrotreaters/hydrocrackers used for upgrading hydrocarbonaceous products, gas streams associated with reformers used to make aromatic products, combinations thereof and the like. Hydrogen recovery can be conducted using various conventional hydrogen recovery processes including, but not limited to, adsorption, absorption (pressure swing adsorption (PSA) and displacement purge cycles (DPC)), cryogenic separation, membrane separation, combinations thereof and the like. While one or more recovery processes may be needed to recover $H_2$ from syngas or tail gas, by-product gas from a reformer or $C_{3+}$ product upgrader will not contain appreciable amounts of CO or $CO_2$ and thus may not need any recovery process except for condensation of heavy hydrocarbons ($C_{6+}$). Additionally, while it is desirable to use recovered hydrogen in processes of the present invention, it is also possible to supplement or replace recovered hydrogen with hydrogen obtained from alternative sources.

Membrane separators are expensive to build and operate, thus routes that do not require membrane separators have lower capital costs and are preferred. Accordingly, a preferred embodiment of the present invention relies on syngas formation comprising partial oxidation, as such processes do not require membrane separation to obtain a hydrogen rich gas stream. Further, deriving hydrogen rich gas streams from upgrading process steps such as naphtha reforming, which generates hydrogen as a by-product, does not require the use of membrane separations to recover the hydrogen. In these processes, rather, condensation of heavy hydrocarbons ($C_{6+}$) alone may allow recovery of hydrogen.

Figure 1:
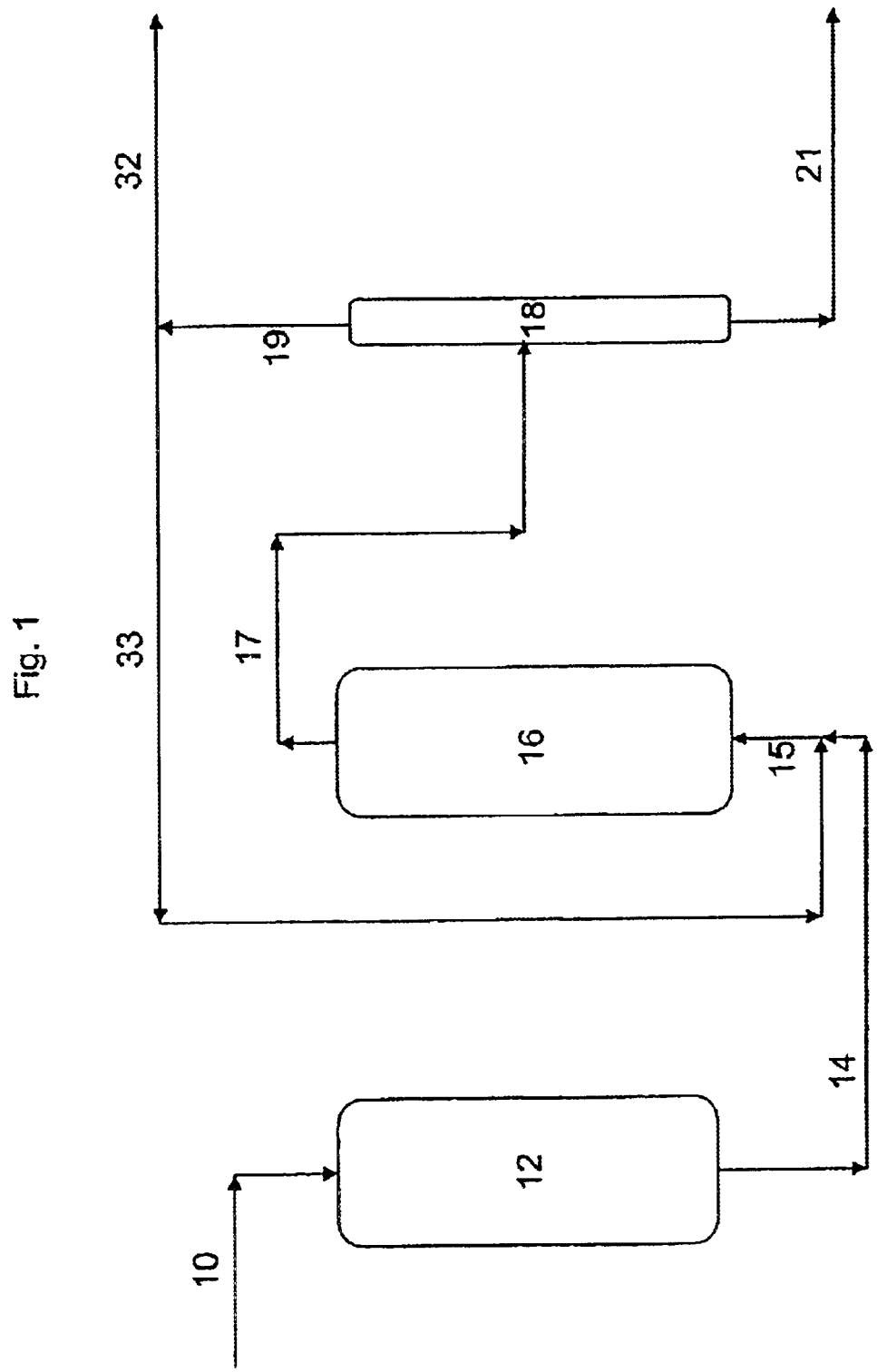
FIG. 1 is a schematic view of a conventional Fischer-Tropsch facility.

Catalysts and conditions for performing Fischer-Tropsch reactions are well known to those of skill in the art, and are described, for example, in EP 0 921 184A1, the contents of which are hereby incorporated by reference in their entirety. A schematic of a conventional Fischer-Tropsch process is shown in FIG. 1.

In this process, a feedstream 10 comprising $C_4$, $O_2$ and $H_2O$ enters a syngas generator 12. The syngas generator 12 generates syngas comprising CO, $H_2$, and $CO_2$. The syngas stream 14 exits the syngas generator 12 and enters a Fischer-Tropsch reactor 16. A product stream 17 exits the Fischer-Tropsch reactor 16 and enters a separator 18. The separator 18 separates the syngas into a hydrocarbonaceous stream 21 comprising $C_{5+}$ liquids and an unreacted gas stream 19.

The unreacted gas stream 19, exiting the separator 18, can be divided into two additional streams. The first stream can be comprised of excess unreacted gas comprising CO, $H_2$ and $CO_2$. This stream exits the process in an exit stream 32, to be used as fuel. The second stream, also comprising unreacted CO, $H_2$, and $CO_2$, can be recycled (33) to be mixed with the syngas stream 14, exiting the syngas generator 12, before entering the Fischer-Tropsch hydrocarbon reactor 16 to produce a mixed syngas stream 15.

The Fischer-Tropsch process can be understood by examining the stoichiometry of the reaction that occurs during a Fischer-Tropsch process. For example, during Fischer-Tropsch processing, syngas (i.e., a mixture including carbon monoxide and hydrogen), is generated, typically from at least one of three basic reactions. Typical Fischer-Tropsch reaction products include paraffins and olefins, generally represented by the formula $nCH_2$. While this formula accurately defines mono-olefin products, it only approximately defines $C_{5+}$ paraffin products. The value of n (i.e., the average carbon number of the product) is determined by reaction conditions including, but not limited to, temperature, pressure, space rate, catalyst type and syngas composition. The desired net syngas stoichiometry for a Fischer-Tropsch reaction is independent of the average carbon number (n) of the product and is about 2.0, as determined by the following reaction equation:

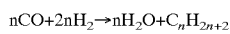

where $C_nH_{2n+2}$ represents typical Fischer-Tropsch reaction products such as, for example, olefins and paraffins. The amount of by-product water produced by the reaction is significant. For instance, when converting the molar ratios to weight ratios, one can see that the relative weight percentages of water to $CH_2$ hydrocarbons is 56%/44%.

The three general reactions that produce syngas from methane are as follows:

1. steam reforming of methane: $CH_4+H_2O \rightarrow CO+3H_2$;
2. dry reforming, or reaction between $CO_2$ and methane: $CH_4+CO_2 \rightarrow 2CO+2H_2$; and
3. partial oxidation using oxygen: $CH_4+½O_2 \rightarrow CO+2H_2$.

Although the above general reactions are the basic reactions used to produce syngas, the ratio of hydrogen to carbon monoxide produced by the above reactions is not always adequate for the desired Fischer-Tropsch conversion ratio of 2.0. For example, in the steam reforming reaction, the resulting ratio of hydrogen to carbon monoxide is 3.0, which is higher than the desired hydrogen to carbon monoxide ratio of 2.0 for a Fischer-Tropsch conversion. Similarly, in the dry reforming reaction, the resulting hydrogen to carbon monoxide ratio is 1.0, which is lower than the desired hydrogen to carbon monoxide ratio of 2.0. In addition to exhibiting a hydrogen to carbon monoxide ratio that is lower than the desired ratio for a Fischer-Tropsch conversion, the above dry reforming reaction also suffers from problems associated with rapid carbon deposition. Finally, because the above partial oxidation reaction provides a hydrogen to carbon monoxide ratio of 2.0, the partial oxidation reaction is the preferred reaction for Fischer-Tropsch conversions.

In commercial practice, an amount of steam added to a partial oxidation reformer can control carbon formation. Likewise, certain amounts of $CO_2$ can be tolerated in the feed. Thus, even though partial oxidation is the preferred reaction for Fischer-Tropsch conversions, all of the above reactions can occur, to some extent, in an oxidation reformer.

During partial oxidation, $CO_2$ forms because the reaction is not perfectly selective. That is, some amount of methane in the reaction will react with oxygen to form $CO_2$ by complete combustion. The reaction of methane with oxygen to form $CO_2$ is generally represented by the following reactions:

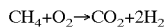

$CH_4+O_2 \rightarrow CO_2+2H_2$ and $CH_4+2O_2 \rightarrow CO_2+2H_2O$.

Furthermore, steam added to the reformer to control coking, or steam produced during the Fischer-Tropsch reaction can react with CO to form $CO_2$ in a water gas shift reaction represented by the following general reaction:

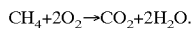

$CO+H_2O \rightarrow CO_2+H_2$.

In addition, light by-product gases, including $C_1-C_4$ hydrocarbons, are frequently used as fuel in furnaces. These fuels often include $CO_2$ from a GTL facility along with some unreacted CO. Moreover, during operation, a furnace provides heat that can contribute to the generation of substantial amounts of $CO_2$.

Thus, invariably a significant amount of $CO_2$ is formed during the conversion of methane into transportation fuels and lubricants by the Fischer-Tropsch process. The $CO_2$ produced during the Fischer-Tropsch process exits the Fischer-Tropsch/GTL process in a tail gas exiting the Fischer-Tropsch unit. Tail gases exiting a Fischer-Tropsch/GTL process comprise any gases that remain unconsumed by the Fischer-Tropsch process.

The overall proportion of carbon in methane that is converted to heavier hydrocarbon products has been estimated to be as high as about 68%. Thus, the remaining 32% can form significant amounts of $CO_2$. These estimates of carbon efficiency are provided, for example, by Bechtel Corporation for a GTL complex using cryogenic air separation, an autothermal reformer, a slurry bed Fischer Tropsch unit and a hydrocracker for conversion of heavy wax into saleable products. See "$CO_2$ Abatement in GTL Plant: Fischer-Tropsch Synthesis," Report # PH3/15, November 2000, published by IEA Greenhouse Gas R&D Programme, the contents of which are hereby incorporated by reference in their entirety. Additionally, although the above estimates are provided for a specific GTL complex, it is believed that similar carbon efficiencies and $CO_2$ emissions would be produced by GTL processes employing alternative technologies.

The above equations represent general stoichiometric equations; they do not reflect an optimum syngas composition for the kinetics or selectivity of a Fischer-Tropsch reaction. Moreover, depending on the nature of the Fischer-Tropsch catalyst, syngas ratios other than 2.0, typically less than 2.0, are used to prepare the feed to a Fischer-Tropsch unit. However, because Fischer-Tropsch units typically produce products exhibiting a hydrogen to carbon ratio of about 2.0, the limiting reagent, typically $H_2$, is consumed first. The extra reagent, typically CO, is then recycled back to the Fischer-Tropsch unit for further conversion. Syngas compositions having hydrogen to carbon ratios other than 2.0 are typically generated by recycling unused reagents. Accordingly, in the present invention, hydrogen rich gas may be recovered from the formed syngas in order to achieve a desired syngas ratio in the feed to the Fischer-Tropsch reactor.

In preferred embodiments, processes of the present invention reduce $CO_2$ emissions by at least about 15%, more preferably by at least about 30% and most preferably by at least about 50%.

The concentration of $CO_2$ (P-$CO_2$) in a flue gas from a furnace in a GTL facility, according to the present invention, in which hydrogen gas used as fuel is combusted, is represented by the following formulae:

$$P\text{-}CO_2 \leq 22/(1-4.76(E\text{-}O_2/100)),$$

preferably $$P\text{-}CO_2 \leq 16/(1-4.76(E\text{-}O_2/100)),$$

wherein E-$O_2$ represents the mole percent of excess oxygen in a flue gas generated from the furnace.

In addition to reducing $CO_2$ emissions, this process can also increase carbon efficiency of a GTL process. Saleable hydrocarbonaceous products generated from the GTL process of the present invention include, but are not limited to, transportation fuels including jet, diesel, and motor gasoline, aromatic hydrocarbons, syncrudes, lubricant base stocks, combinations thereof and the like.

One source of hydrogen, for use in processes of the present invention, is hydrogen generated, for example, during naphtha reformation. Hydrogen is generated during naphtha reformation by converting at least a portion of $C_{5+}$ Fischer-Tropsch product into aromatics. A typical reaction for a $C_6$ paraffin is as follows:

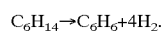

$C_6H_{14} \rightarrow C_6H_6+4H_2$.

Processes for converting paraffin-rich streams into aromatics are well known in the field. Commonly, such conversion processes referred to as "naphtha reforming processes," are divided into two classes. The first class of naphtha reforming processes are referred to as "conventional reforming processes." Conventional reforming processes use a catalyst composed, for example, of Pt, alumina, and a halogen, typically Cl, and further typically comprising Re or Ir. Generally, the catalyst is exposed to sulfur prior to being used in the reaction. Those of ordinary skill in the art commonly expose conventional reforming catalysts to sulfur prior to use in the reaction to obtain highly selective conversion of $C_{8-10}$ paraffins into aromatics. However, it is well known that the exposure of conventional reforming catalysts to high levels of sulfur (>10 ppm) during use generates poor selectivity for the conversion of $C_{8-10}$ paraffins into aromatics. In addition, conventional reforming catalysts are not very selective for the conversion of hexane and heptane to aromatics.

The second class of naphtha reforming processes are referred to as "non-acidic zeolitic reforming processes" such as, for example, AROMAX® reforming processes. Non-acidic zeolitic reforming processes use a catalyst comprising Pt, a non-acidic zeolite, typically an L-zeolite, K, optionally Ba, mixtures thereof and the like. Generally, non-acidic zeolitic reforming catalysts are not exposed to sulfur prior to operation. In addition, non-acidic zeolitic reforming catalysts are highly selective for the conversion of hexane and heptane into aromatics.

The present invention can employ either or both of the above naphtha reforming processes. Aromatic products produced by the above reforming processes can be used in various applications including, but not limited to, high octane blend components for gasolines, typically including a mixture of $C_6$–$C_{10}$ aromatics, benzene for use in chemicals, especially for use in the production of cyclohexane, ethylbenzene and/or cumene, toluene for use as a chemical and xylenes for use as chemicals, especially for the production of paraxylene.

The removal of hydrogen from a Fischer-Tropsch product causes the net $C_{5+}$ product to have a lower hydrogen to carbon stoichiometric ratio. That is, even though the initial hydrogen to carbon ratio is about 2.0, after conversion of a portion of the product into aromatics, the hydrogen to carbon stoichiometric ratio of the $C_{5+}$ product declines to a value less than about 2.0, preferably less than about 1.95, and more preferably less than about 1.90. Because it is preferable to make aromatics from a $C_6$–$C_{10}$ portion of the product, this stream often contains a lower amount of hydrogen than the heavier product. Preferably, the $C_6$–$C_{10}$ portion of the $C_{5+}$ hydrocarbon product has a lower hydrogen to carbon ratio than the $C_{10+}$ product.

The hydrogen to carbon stoichiometric ratio of the products can be determined using a number of suitable methods well-known to those of skill in the art. These suitable methods include, for example, chemical analyses for identification of individual species such as Carlo-Erba combustion and gas chromatography, and NMR spectroscopy. Chemical analyses for individual species are preferred.

The product streams from the process of the present invention can constitute a mixture such as, for example, a synthetic crude. In addition, product streams of the present invention can be produced, shipped and/or sold as individual streams such as LPG ($C_3$'s and $C_4$'s), condensate ($C_5$'s and $C_6$'s), high-octane blend components ($C_6$–$C_{10}$ aromatic-containing streams), jet fuel, diesel fuel, other distillate fuels, lube blend stocks or lube blend feedstocks. The desired stoichiometric ratios specified in this invention refer to the net product analysis.

Hydrogen generated during naphtha reformation can also be used for other processes such as, for example, hydrotreating a portion of the $C_{5+}$ product to remove olefins, oxygenates and other trace heteroatoms.

During operation of a Fischer-Tropsch GTL facility, the fuel used in the GTL process is commonly composed of unreacted syngas, often referred to as "tail gas." Under typical operating parameters for a slurry bed Fischer-Tropsch process, operating with a catalyst that does not promote a water-gas-shift reaction and with oxygen as an oxidant, the tail gas molar composition, on a water-free basis, is:

| | |
|---|---|
| hydrogen | 25 |
| carbon monoxide | 23 |
| carbon dioxide | 35 |
| methane | 14 |
| $C_{2+}$ | 3 |
| Total | 100 |

If air is used as an oxidant to form the syngas, large quantities of nitrogen are often incorporated in the syngas and the unreacted tail gas. Thus, the present invention relates to a syngas that is composed of very little nitrogen such as, for example, less than about 5 mole percent, more preferably less than about 1 mole percent.

When the tail gas is burned as a fuel, flue gas is generated (see Table below). The nitrogen ($N_2$) associated with combustion of each element is calculated from the relative molar concentration of $N_2$ and $O_2$ in air, about 79 and about 21, respectively.

| | Combustion Stoichiometries | | | Flue Gas Moles | |
|---|---|---|---|---|---|
| Component | Mole % | $O_2$ required | $CO_2$ produced | $N_2$ associated | $CO_2$ | $N_2$ |
| Hydrogen | 25 | ½ | 0 | 1.88 | 0 | 0.47 |
| CO | 23 | ½ | 1 | 1.88 | 0.23 | 0.43 |
| $CO_2$ | 35 | 0 | 1 | 0 | 0.35 | 0 |
| Methane | 14 | 2 | 1 | 7.52 | 0.14 | 1.05 |
| Ethane | 3 | 7/2 | 2 | 13.17 | 0.06 | 0.40 |
| Total | 100 | | | | 0.78 | 2.35 |
| Molar Percentage, water-free basis | | | | | 25 | 75 |

The flue gas compositions of 25 mol % $CO_2$ and 75 mol % $N_2$ are on a water free basis, as water is produced by the reaction of oxygen with hydrogen, methane, and ethane. The hydrogen content of the fuel gas can be increased to higher values, resulting in flue gases having a lower $CO_2$ concentration. The following table shows the results of this calculation wherein other components in the fuel gas are reduced in proportion.

| Fuel Gas Hydrogen Content, Mole Percent | Carbon Dioxide Content of Flue Gas (mole percent, water-free basis) |
|---|---|
| 25 | 25 |
| 40 | 22 |
| 60 | 16 |

Thus, as the mole percent of hydrogen in the fuel gas increases, the mole percent of $CO_2$ in the resulting flue gas decreases. While the energy content of the fuel may change somewhat, the amount of the fuel or the burner design can be adjusted to accommodate a new fuel, as described below. The above stoichiometries apply to complete and ideal combustion. In a furnace, combustion is essentially complete and thus, $H_2$ is present in the flue gas only in trace amounts. Excess oxygen present in the flue gas assures complete combustion of the carbon monoxide in the furnace, preventing the emission of harmful carbon monoxide. Typically, furnaces are designed to operate with about 2–3 mole percent excess oxygen, but may operate at between about 3–5 mole percent excess oxygen. Because excess oxygen in the flue gas will dilute the carbon dioxide, corrections may be necessary.

Assuming that there are (x) moles of excess oxygen per mole flue gas, there will also be 79/21 (x) moles of $N_2$ added to the flue gas in association with this excess oxygen. Thus, when using a 25% hydrogen-containing fuel gas, the total number of moles, on a water-free basis, in the flue gas will be:

| | |
|---|---|
| $N_2$ | 0.75 |
| $CO_2$ | 0.25 |
| Excess $O_2$ | x |
| $N_2$ with excess $O_2$ | 3.76 x, wherein 3.76 = 79/21 |
| Total moles | 1 + 4.76 (x). |

The percent excess oxygen ($E-O_2$) in the flue gas is a measurable quantity that can be calculated using the following equation:

$$E-O_2/100 = x/(1+4.76x).$$

Solving for x in terms of $E-O_2$ results in the following equation:

$$x = (E-O_2/100)1 - 4.76(E-O_2/100).$$

Using this value for x, the total number of moles is then:

$$\text{total moles} = (1 - 4.76(E-O_2/100))/(1 - 4.76(E-O_2/100)).$$

Solving for the percent $CO_2$ ($P-CO_2$) in the flue gas, as a function of $E-O_2$, results in the following equation:

$$P-CO_2 = 25/(1 - 4.76(E-O_2/100)).$$

If sufficient hydrogen is added to the fuel gas to raise its hydrogen content to about 40%, the flue gas composition will be:

$$P-CO_2 = 22/(1 - 4.76(E-O_2/100)).$$

If sufficient hydrogen is added to the fuel gas to raise its hydrogen content to about 60%, the flue gas composition will be:

$$P-CO_2 = 16/(1 - 4.76(E-O_2/100)).$$

The use of hydrogen as a fuel, and the reduction of $CO_2$ emissions will likely necessitate a decrease in hydrogen content of the product generated from a GTL process. In conventional GTL processes, the products are predominantly paraffins, linear olefins and linear alcohols. These products have a hydrogen to carbon molar ratio of about 2, or greater. When hydrogen is used as a fuel, the hydrogen to carbon ratio will likely decrease to below about 1.95 and preferably below about 1.90. The most attractive source of hydrogen is the $C_6$–$C_{10}$ portion that can be readily reformed to obtain aromatics and sold as a high-octane gasoline or aromatic hydrocarbons such as, for example, benzene, toluene, xylene, combinations thereof, and the like. In contrast, the $C_{11+}$ products are best used, for example, for jet fuel, diesel fuel, and lube-based products. Generally, $C_{11+}$ products are not converted into aromatics and hydrogen. When the $C_6$–$C_{10}$ portion of a syncrude is selectively reformed to produce hydrogen and higher carbon number portions are not converted to aromatics, the hydrogen to carbon molar ratio of at least a portion of the $C_6$–$C_{10}$ product will be at least about 0.1 unit less than the hydrogen to carbon molar ratio of the $C_{11+}$ product. Preferably, the hydrogen to carbon molar ratio of at least a portion of the $C_6$–$C_{10}$ product will be at least about 0.25 unit less than the hydrogen to carbon molar ratio of the $C_{11+}$ product.

Processes for the recovery of hydrogen from other gaseous streams is well known in the art. Suitable techniques for recovering hydrogen from gaseous streams include, but are not limited to, adsorption (pressure swing adsorption (PSA) and displacement purge cycles (DPC)), membrane separation, and cryogenic separation. These technologies are described, for example, in *Separation Process Technology*, Jimmny L. Humprey, George E. Keller II, McGraw-Hill, 1997, pp. 175–268, Handbook of *Separation Techniques for Chemical Engineers*, 2nd Ed., Philip A. Schweitzer, McGraw-Hill, Sections 3.1, 3.2, 3.3, and *Chemical Engineer's Handbook*, 4th Ed., John H. Perry, McGraw-Hill, pp. 12–21 to 12–41 with specific reference to pp. 12–32 to 12–33.

On rare occasions, hydrogen has been used as a fuel in petroleum refining. The rare use of hydrogen in conventional petroleum refining is due, at least in part, to the unusually high costs of products produced by such refining processes and the high alternative value uses for upgrading petroleum. Nevertheless, hydrogen is used as a fuel in rare locations when it is produced as a by-product and when there are no alternative uses for the hydrogen at a particular site. This can be the case, for example, in petrochemical manufacture of ethylene from ethane.

The processes of the present invention further provide integrated processes, which refers to processes comprising a sequence of steps, some of which may be parallel to other steps in the process, but which are interrelated or somehow dependent upon either earlier or later steps in the total process. Specifically, according to the processes of the present invention, the furnace or furnaces fueled by hydrogen produced in the GTL facility are used to power other units in the GTL facility. For example, the furnace may be used to provide heat to a syngas generator, a Fischer-Tropsch reactor, one or more separators or hydrogen recovery means, or combinations thereof. Thus, the furnace may power a unit which is necessary for the production of hydrogen, which fuels the furnace. The integrated processes of the present invention, wherein by-products are used as fuel, not only result in minimized $CO_2$ emissions from GTL facilities, but also result in efficiencies and cost savings, compared to processes that are not integrated.

The furnace or furnaces fueled according to the present invention may also take the form of steam generators (boilers), providing steam used to rotate equipment such as used in, for example, pumps, compressors and air separation facilities.

When hydrogen is used as a fuel, minor adjustments must be made to the design and/or operation of the furnace. Typical adjustments to the design and/or operation of the furnace include, but are not limited to, providing the furnace with larger gas manifolds to accommodate relatively low-density hydrogen, providing the furnace with larger gas burner nozzles to accommodate relatively low-density hydrogen and providing the furnace with increased convection zone heating tubes to accommodate less radiant hydrogen. If hydrogen is burned as a replacement for methane in the existing furnace, and the gas density is too low, the hydrogen can be supplemented with a heavier hydrocarbon (e.g., propane, butane, etc.) to increase gas density to a density equivalent to that of methane while still achieving a reduction in $CO_2$ emissions.

Methods for measuring $CO_2$ and excess oxygen in flue gas are well known in the industry. Conventional methods for measuring $CO_2$ and excess oxygen include, but are not limited to, gas chromatography, mass spectroscopy, Orsat chemical analysis and on-line analysis. Of these known methods, on-line analysis is preferred.

Methods for on-line analysis of flue gases are described, for example, in James A. Janke, *Continuous Emissions Monitoring*, Van Norstrand Reinhold and Kenneth J. Clevett, *Process Analyzer Technology*, John Wiley & Sons. Typically, $CO_2$ is analyzed by a technology using infrared adsorption. Excess oxygen is typically analyzed using oxygen sensor technology such as, for example, zirconium oxide probes or paramagnetic sensors. On-line analyzers are available from a number of vendors. For instance, for measuring excess oxygen, on-line analyzers are available from vendors including Rosemont Analytical, Ametec/Thermox, Teledyne and Servomex. In addition, for measurement of carbon dioxide, on-line analyzers are available from vendors including Rosemont Analytical and Thermoenvironmental.

Figure 2:
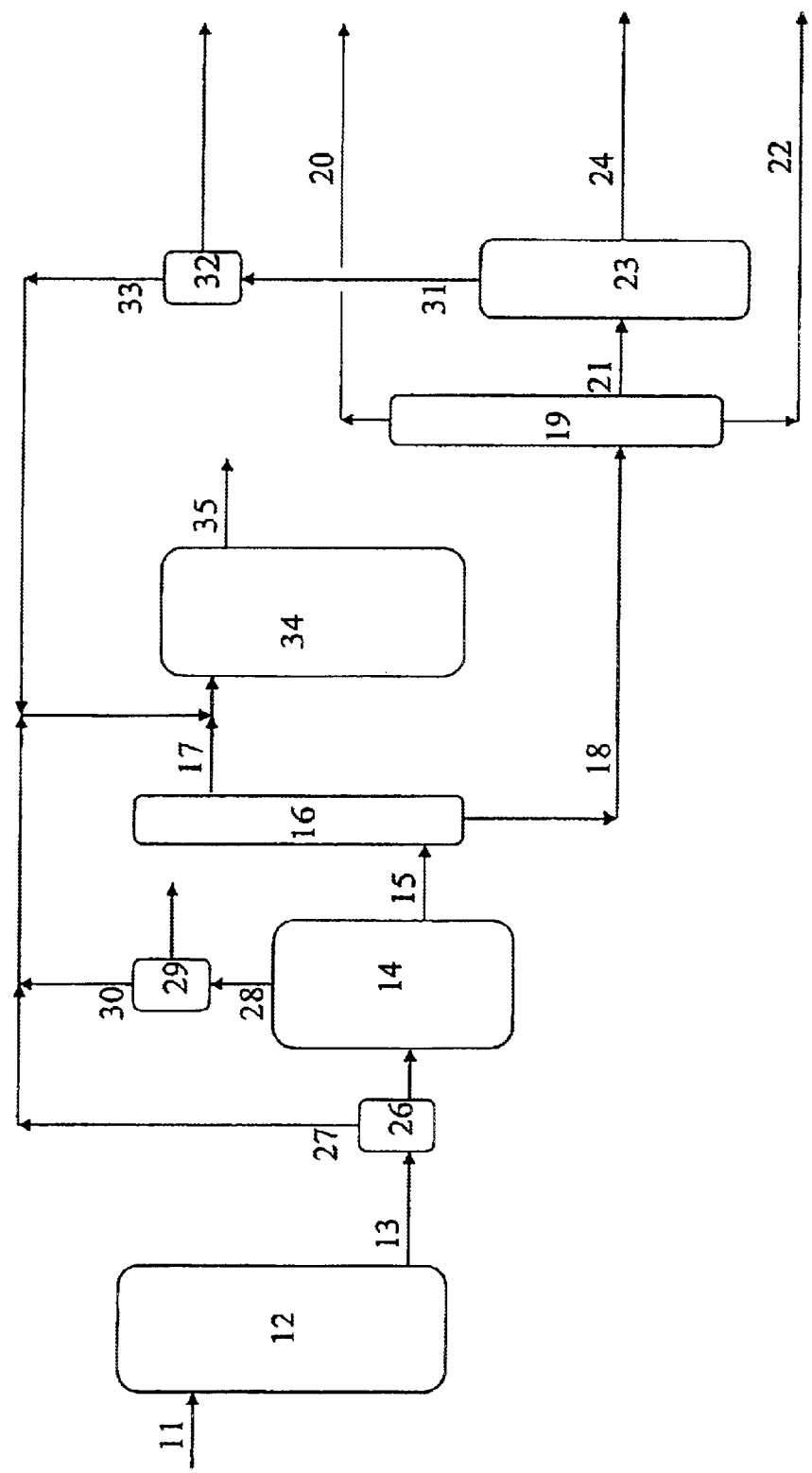
FIG. 2 is a schematic view of an exemplary embodiment of a GTL facility of the present invention.

An exemplary embodiment of a GTL facility according to the presently claimed invention is depicted in FIG. 2. In this embodiment a methane-containing stream 11 is introduced into a syngas generator 12. The syngas generator 12 generates syngas 13, which passes through hydrogen recovery means 26 and then enters a Fischer-Tropsch reactor 14. The Fischer-Tropsch reactor produces two product streams: a liquid $C_3$+ containing stream 15 and a vapor $C_3$+ containing stream 28. Stream 28 is sent to separator 16 to generate unreacted gas stream 17 and a recovered $C_3$+ liquid stream 29. $C_3$+ liquid streams 15 and 29 are combined in 18, and sent to second separator 19. The second separator 19 separates the hydrocarbonaceous products stream 18 into a $C_1$–$C_5$ product stream 20, a naphtha stream 21 and a $C_{10+}$ product stream 22. The naphtha stream 21 enters a naphtha reformer 23 wherein the naphtha stream 21 is reformed to produce a $C_6$–$C_{10}$ product stream 24 and a hydrogen by-product stream 31. Unreacted gas stream 17 is further separated in separator 36 into hydrogen-reduced gas stream 38 and hydrogen rich gas stream 37.

Hydrogen rich gas is then recovered from at least one of the syngas stream 13, unreacted gas stream 17 and the hydrogen by-product stream 31 using hydrogen recovery means 26, 36 and 32. Additionally, while the embodiment in FIG. 2 is depicted as including three separate hydrogen recovery means, it is also possible to use a single (or two) hydrogen recovery means. Once recovered, the hydrogen rich gas mixes with the unreacted gas stream 17 via recovered hydrogen streams 27 and 33 exiting the hydrogen recovery means 26 and 32, respectively. Further, while the recovered hydrogen streams 27 and 33 are depicted as mixing with the gas stream 37 before entering the furnace 34, it is equally suitable for the recovered hydrogen streams 27 and 33 to mix with the gas stream 37 during and/or after the gas stream 37 enters the furnace 34 instead of, or in addition to, mixing with the stream 37 prior to entering the furnace 34.

Regardless of the specific hydrogen recovery means used and the sequence in which the recovered hydrogen mixes with the unreacted gas stream, the recovered hydrogen acts to reduce the amount of $CO_2$ present in the flue gas 35 emitted from the furnace 34. In particular, the hydrogen acts to reduce the mole percent of $CO_2$ in the flue gas 35 such that the mole percent of $CO_2$ in the flue gas 35 is represented by the formula:

$$P\text{-}CO_2 \leq 22/(1-4.76(E\text{-}O_2/100)),$$

and more preferably by the formula:

$$P\text{-}CO_2 \leq 16/(1-4.76(E\text{-}O_2/100)).$$

While the present invention has been described with reference to specific embodiments, this application is intended to cover those various changes and substitutions that may be made by those of ordinary skill in the art without departing from the spirit and scope of the appended claims.

What is claimed is:

1. A process for manufacturing hydrocarbonaceous products from a methane-containing feedstock in a GTL facility comprising at least one furnace generating reduced $CO_2$ emissions, the process comprising:
   a) forming syngas from a methane-containing feedstock by means of a partial oxidation reaction using a gaseous oxidant comprising molecular oxygen;
   b) converting the syngas into $C_{3+}$ liquid products and recovering an unreacted gas;
   c) separating the $C_{3+}$ liquid products to obtain a naphtha;
   d) reforming the naphtha to produce a by-product hydrogen-containing gas stream;
   e) recovering a hydrogen rich gas stream from at least one of the syngas and the by-product hydrogen-containing gas stream or combinations thereof; and
   f) using a hydrogen rich fuel comprising the hydrogen rich gas stream and the unreacted gas in at least one furnace in the GTL facility to reduce $CO_2$ emissions generated by the facility.

2. The process of claim 1, wherein the GTL facility is a Fischer-Tropsch facility.

3. The process of claim 1, wherein the syngas comprises about 5 mole percent or less nitrogen.

4. The process of claim 1, wherein the $CO_2$ emissions from the GTL facility are at least about 15% less than if recovered hydrogen were not used as a fuel in the GTL facility.

5. The process of claim 4, wherein the $CO_2$ emissions from the GTL facility are at least about 30% less than if recovered hydrogen were not used as a fuel in the GTL facility.

6. The process of claim 5, wherein the $CO_2$ emissions from the GTL facility are at least about 50% less than if recovered hydrogen were not used as a fuel in the GTL facility.

7. The process of claim 1, wherein a hydrocarbonaceous product having a hydrogen to carbon stoichiometric ratio below about 2.0 is isolated.

8. The process of claim 7, wherein the hydrogen to carbon stoichiometric ratio is below about 1.90.

9. The process of claim 1, wherein the at least one furnace using the hydrogen rich fuel is altered in a manner by providing the furnace with an enlarged gas supply line, providing the furnace with enlarged burner nozzles, increasing convection zone heating of the furnace or combinations thereof.

10. The process of claim 1, wherein the hydrogen rich fuel comprises at least about 40% hydrogen, on a molar basis.

11. The process of claim 10, wherein the hydrogen rich fuel comprises at least about 60% hydrogen, on a molar basis.

12. A process for manufacturing hydrocarbonaceous products from a methane-containing feedstock in a GTL facility comprising at least one furnace generating reduced $CO_2$ emissions, the process comprising:

a) forming syngas from a methane-containing feedstock by means of a partial oxidation reaction using a gaseous oxidant comprising molecular oxygen;

b) converting the syngas into $C_{3+}$ liquid products and recovering an unreacted gas;

c) separating the $C_{3+}$ liquid products to obtain a naphtha;

d) reforming the naphtha to produce a by-product hydrogen-containing gas stream;

e) recovering a hydrogen rich gas stream from at least one of the syngas and the by-product hydrogen-containing gas stream or combinations thereof; and f) using a hydrogen rich fuel comprising the hydrogen rich gas stream and the unreacted gas in at least one furnace in the GTL facility so that a mole percent of $CO_2$ in a flue gas generated from the furnace, on a water-free basis, is represented by the following formula:

$$P\text{-}CO_2 \leq 22/(1-4.76(E\text{-}O_2/100)),$$

wherein $E\text{-}O_2$ represents mole percent excess oxygen, on a water-free basis.

13. The process of claim 12, wherein the mole percent of $CO_2$ in the flue gas from the furnace, on a water-free basis, is represented by the following formula:

$$P\text{-}CO_2 \leq 16/(1-4.76(E\text{-}O_2/100)).$$

14. The process of claim 12, wherein the GTL facility is a Fischer-Tropsch facility.

15. The process of claim 12, wherein the syngas comprises about 5 mole percent or less nitrogen.

16. The process of claim 12, wherein a hydrocarbonaceous product having a hydrogen to carbon stoichiometric ratio below about 2.0 is isolated.

17. The process of claim 16, wherein the hydrogen to carbon stoichiometric ratio is below about 1.90.

18. The process of claim 12, wherein the at least one furnace using the hydrogen rich fuel is altered in a manner by providing the furnace with an enlarged gas supply line, providing the furnace with enlarged burner nozzles, increasing convection zone heating of the furnace or combinations thereof.

19. The process of claim 12, wherein the hydrogen rich fuel comprises at least about 40% hydrogen, on a molar basis.

20. The process of claim 19, wherein the hydrogen rich fuel comprises at least about 60% hydrogen, on a molar basis.

* * * * *